United States Patent
Hirosue et al.

(10) Patent No.: US 11,052,871 B2
(45) Date of Patent: Jul. 6, 2021

(54) BURGLAR SENSOR ARRANGEMENT STRUCTURE

(71) Applicant: MAZDA MOTOR CORPORATION, Hiroshima (JP)

(72) Inventors: Shotaro Hirosue, Hiroshima (JP); Yasuhiro Ohi, Hiroshima (JP); Masaaki Sakiyama, Hiroshima (JP); Kazufumi Adachi, Higashihiroshima (JP); Yukinori Monden, Hiroshima (JP); Masahiro Iriguchi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/641,610

(22) PCT Filed: Aug. 17, 2018

(86) PCT No.: PCT/JP2018/030552
§ 371 (c)(1),
(2) Date: Feb. 24, 2020

(87) PCT Pub. No.: WO2019/039405
PCT Pub. Date: Feb. 28, 2019

(65) Prior Publication Data
US 2021/0031723 A1    Feb. 4, 2021

(30) Foreign Application Priority Data
Aug. 25, 2017 (JP) .............................. JP2017-162401

(51) Int. Cl.
*B60R 25/10* (2013.01)
*B60R 25/31* (2013.01)

(52) U.S. Cl.
CPC .......... *B60R 25/1009* (2013.01); *B60R 25/31* (2013.01)

(58) Field of Classification Search
CPC ............................ B60R 25/1009; B60R 25/31
See application file for complete search history.

(56) References Cited

U.S. PATENT DOCUMENTS 5,808,544 A * 9/1998 Kani .................... B60R 25/1009
340/426.26
5,856,778 A * 1/1999 Kani .................... B60R 25/1009
340/426.26

(Continued)

FOREIGN PATENT DOCUMENTS

JP    2013-221901 A    10/2013
JP    2013-221902 A    10/2013

(Continued)

OTHER PUBLICATIONS

Written Opinion Issued in JP 2017-162401 by the Japanese Patent Office dated Nov. 26, 2018 (Year: 2018).*

(Continued)

*Primary Examiner* — Nay Tun
(74) *Attorney, Agent, or Firm* — Studebaker & Brackett PC

(57) ABSTRACT

Disclosed is a burglar sensor arrangement structure for arranging, with respect to a vehicle interior member (10), a burglar sensor configured to detect an intrusion into a vehicle interior. The burglar sensor arrangement structure comprises an ultrasonic wave generation unit (2) for generating an ultrasonic wave, and a throat portion (18) for radiating the ultrasonic wave generated in the ultrasonic wave generation unit, from a outside opening (18*a*) thereof into the vehicle interior, wherein the vehicle interior member (Continued)

is formed with a groove (20), and the outside opening of the throat portion is opened at a bottom surface of the groove.

7 Claims, 7 Drawing Sheets

(56) References Cited

U.S. PATENT DOCUMENTS

| | | | | |
|---|---|---|---|---|
| 6,157,293 | A * | 12/2000 | Bonhoure | B60R 25/1009 307/10.2 |
| 6,587,047 | B2 * | 7/2003 | Nilsson | B60R 25/1009 340/541 |
| 6,631,096 | B2 * | 10/2003 | Gillis | B60R 25/1009 340/552 |
| 7,408,446 | B2 * | 8/2008 | Umeo | B60R 25/1004 180/287 |
| 9,610,921 | B2 * | 4/2017 | Kyung | B60R 25/1004 |
| 9,636,709 | B2 * | 5/2017 | Yamamoto | G10K 9/22 |
| 10,183,649 | B2 * | 1/2019 | Simonazzi | G01S 15/88 |
| 2003/0174052 | A1 * | 9/2003 | Oku | B60R 25/1009 340/426.1 |
| 2006/0217864 | A1 * | 9/2006 | Johnson | B60N 2/067 701/45 |
| 2017/0361806 | A1 * | 12/2017 | Scheim | H04W 4/40 |

FOREIGN PATENT DOCUMENTS

| | | | | |
|---|---|---|---|---|
| JP | | 5732616 B2 * | 6/2015 | G01S 7/521 |
| KR | 10-2012-0016881 A | | 2/2012 | |
| KR | 20120016881 A * | | 2/2012 | |
| WO | 2011/010494 A1 | | 1/2011 | |

OTHER PUBLICATIONS

International Preliminary Report on Patentability and Written Opinion issued in PCT/JP2018/030552; dated Feb. 25, 2020.
International Search Report issued in PCT/JP2018/030552; dated Oct. 2, 2018.
Office Action issued in JP 2017-162401; mailed by the Japanese Patent Office dated Sep. 25, 2018.
The extended European search report issued by the European Patent Office dated Jul. 24, 2020, which corresponds to European Patent Application No. 18848906.6-1206 and is related to U.S. Appl. No. 16/641,610.

* cited by examiner

BURGLAR SENSOR ARRANGEMENT STRUCTURE

TECHNICAL FIELD

The present invention relates to a burglar sensor arrangement structure, and more particularly to a burglar sensor arrangement structure for arranging, with respect to a vehicle interior member, a burglar sensor configured to detect an intrusion into a vehicle interior.

BACKGROUND ART

A vehicle intrusion detection device is described in JP 2013-221902A (Patent Document 1). In this vehicle intrusion detection device, ultrasonic wave transmitting means and ultrasonic wave receiving means are covered by a cover member having an opening for allowing passage of an ultrasonic wave. The opening of the cover member is provided with a plurality of fins, wherein a specific part of the fins are configured to reflect a part of the ultrasonic wave. A reflection direction of an ultrasonic beam reflected by the specific fins is set to become different from the direction of a main ultrasonic beam to allow the ultrasonic beam reflected by the specific fins to form a side lobe. This makes it possible to obtain a side lobe having a desired direction, with a simple structure.

CITATION LIST

[Patent Document]
  Patent Document 1: JP 2013-221902A

SUMMARY OF INVENTION

Technical Problem

In the invention described in the Parent Document 1, with a view to forming a side lobe having a desired direction, in an ultrasonic wave generated by the ultrasonic wave transmitting means, the ultrasonic wave transmitting means is covered by the cover member, such that the ultrasonic wave is radiated through the opening of the cover member. However, in order to allow the ultrasonic wave radiated from the ultrasonic wave transmitting means to be reflected by the fins provided in the opening of the cover member, thereby obtaining a desired side lobe, the ultrasonic wave transmitting means and the cover member need to be spaced apart from each other to some extent. Thus, in a case where it is attempted to install the vehicle intrusion detection device (burglar sensor) described in the Parent Document 1, on a vehicle exterior side of a vehicle interior member arranged in a vehicle interior (passenger compartment) of a vehicle, a large space is required for the installation. However, there is a problem that it is difficult to ensure such a large installation space.

It is therefore an object of the present invention to provide a burglar sensor arrangement structure capable of installing a burglar sensor with respect to a vehicle interior member in a compact manner, while giving a desired directivity to a radiated ultrasonic wave.

Solution to Technical Problem

In order to solve the above problem, the present invention provides a burglar sensor arrangement structure for arranging, with respect to a vehicle interior member, a burglar sensor configured to detect an intrusion into a vehicle interior. The burglar sensor arrangement structure comprises: an ultrasonic wave generation unit for generating an ultrasonic wave; and a throat portion for radiating the ultrasonic wave generated in the ultrasonic wave generation unit, from an outside opening thereof into the vehicle interior, wherein the vehicle interior member is formed with a groove, and the outside opening of the throat portion is opened at a bottom surface of the groove.

In the burglar sensor arrangement structure of the present invention having the above feature, when the ultrasonic wave generation unit generates an ultrasonic wave, the generated ultrasonic wave is guided through the throat portion and radiated from the outside opening of the throat portion. The outside opening of the throat portion is opened at the bottom surface of the groove formed on the vehicle interior member. Thus, the ultrasonic wave radiated from the outside opening is radiated from the groove into the vehicle interior.

More specifically, in the above burglar sensor arrangement structure of the present invention, the outside opening of the throat portion is opened at the bottom surface of the groove, so that the ultrasonic wave radiated from the outside opening is emitted into the vehicle interior while undergoing reflection at an inner wall surface of the groove. As a result, the inner wall surface of the groove acts like an acoustic horn, which makes it possible to enhance ultrasonic wave propagation capability, and control directivity of the ultrasonic wave radiated into the vehicle interior via the groove. Further, the outside opening of the throat portion associated with the ultrasonic wave generation unit is opened to the vehicle interior member, so that there is no need to arrange the ultrasonic wave generation unit and the vehicle interior member such that they are largely spaced apart from each other, and thereby it is possible to install the burglar sensor with respect to the vehicle interior member in a compact manner. Further, the groove provided on the vehicle interior member in which the burglar sensor is arranged can be easily fit in ornaments to be given to the vehicle interior member, so that it is possible to arrange the burglar sensor with respect to the vehicle interior member substantially without spoiling aesthetic quality of a vehicle interior.

Preferably, in the burglar sensor arrangement structure of the present invention, the throat portion is provided by a number of two per said ultrasonic wave generation unit, wherein respective outside openings of the two throat portions are opened at the bottom surface of the same groove.

According to this feature, the outside openings of the two throat portions are opened at the bottom surface of the same groove, so that it is possible to further enhance the ultrasonic wave propagation capability. Further, the arrangement of the two outside openings may be appropriately set. In this case, it becomes possible to more easily control the directivity of a radiated ultrasonic wave.

Preferably, in the burglar sensor arrangement structure of the present invention, the vehicle interior member is a console cover of a roof center console mounted to a ceiling surface of the vehicle interior.

According to this feature, the burglar sensor is arranged with respect to the console cover of the roof center console, which is the vehicle interior member, so that it is possible to radiate an ultrasonic wave from a vehicle width-directional approximately center of the ceiling surface of the vehicle interior to allow the ultrasonic wave to be easily spread throughout the vehicle interior.

Preferably, in the burglar sensor arrangement structure of the present invention, the vehicle interior member is formed with at least three grooves, wherein at least one of the grooves is formed on each sides of the groove to which the outside opening of the throat portion is opened.

According to this feature, at least one of the grooves is additionally formed on each sides of the central groove to which the outside opening of the throat portion is opened, so that the ultrasonic wave radiated from the central groove is hit against and reflected by wall surfaces of the side grooves formed on both sides of the central groove. By causing interference between a reflected wave from the wall surface of each of the side grooves and the ultrasonic wave directly radiated from the central groove to which the outside opening of the throat portion is opened, it becomes possible to form a desired directivity characteristic, and further improve the ultrasonic wave propagation capability.

More preferably, in the above burglar sensor arrangement structure, the vehicle interior member is formed with at least five grooves, wherein the groove to which the outside opening of the throat portion is opened has a width greater than that of each of the remaining grooves.

According to this feature, the five or more grooves are formed on the vehicle interior member, so that it is possible to cause interference with reflected waves from a larger number of side grooves. This makes it possible to give a wider variety of directivities to the ultrasonic wave to be radiated, and further improve the ultrasonic wave propagation capability.

Effect of Invention

The burglar sensor arrangement structure makes it possible to install the burglar sensor with respect to the vehicle interior member in a compact manner, while giving a desired directivity to a radiated ultrasonic wave.

DESCRIPTION OF EMBODIMENTS

With reference to the accompanying drawings, preferred embodiments of the present invention will now be described.

Figure 1:
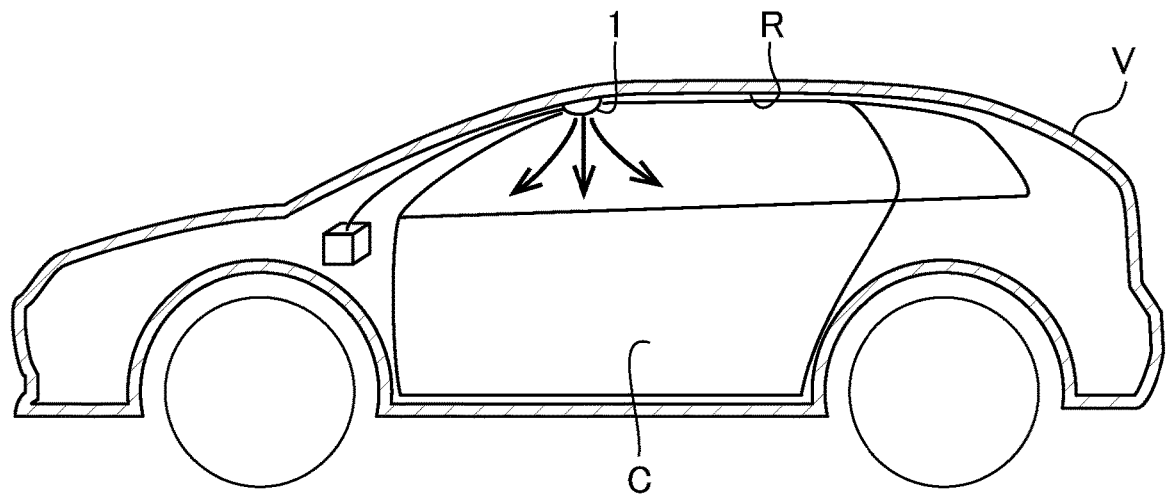
FIG. 1 is a sectional view of a vehicle employing a burglar sensor arrangement structure according to a first embodiment of the present invention.

FIG. 1 is a sectional view of a vehicle employing a burglar sensor arrangement structure according to a first embodiment of the present invention.

As shown in FIG. 1, a burglar sensor in the burglar sensor arrangement structure according to the first embodiment is arranged within a roof center console 1 mounted to an inner surface of a vehicle interior (passenger compartment) C of the vehicle V. More specifically, the roof center console 1 is mounted to a front end region of a ceiling surface R (roof) of the vehicle interior C of the vehicle V at a vehicle width-directional approximately center thereof. The burglar sensor comprises a transmitting unit for radiating an ultrasonic wave, and a receiving unit for receiving a reflected wave of the radiated ultrasonic wave. The burglar sensor is configured to detect whether or not there is a moving object within the vehicle interior C, based on a Doppler effect arising in the ultrasonic wave received by the receiving unit, thereby detecting an unauthorized intruder.

Figure 2:
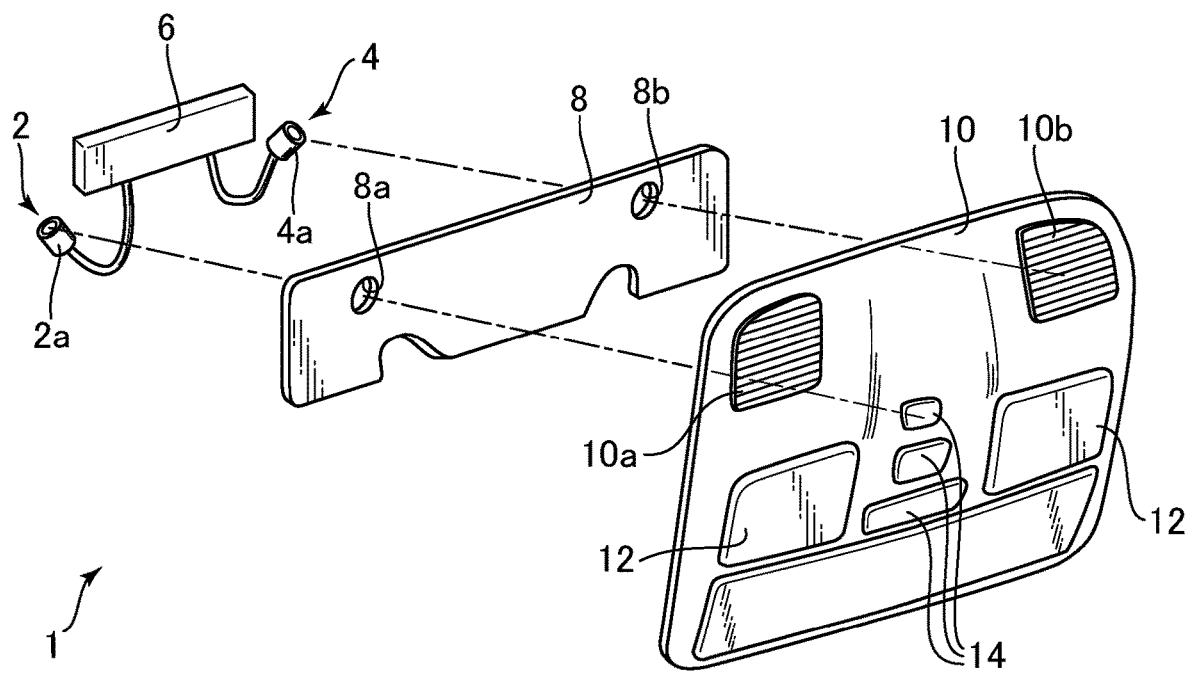
FIG. 2 is an exploded perspective view of a roof center console employing the burglar sensor arrangement structure according to the first embodiment.

FIG. 2 is an exploded perspective view of the roof center console in the first embodiment.

As shown in FIG. 2, the roof center console 1 comprises: an ultrasonic wave oscillator 2 which is an ultrasonic wave generation unit; an ultrasonic wave receiver 4 which is an ultrasonic wave receiving unit; a control unit 6 for controlling the ultrasonic wave oscillator 2 and the ultrasonic wave receiver 4; a mounting member 8 for holding each of the ultrasonic wave oscillator 2 and the ultrasonic wave receiver 4 at a given position; and a console cover 10 which is a vehicle interior member for housing the above components. In this embodiment, a combination of the ultrasonic wave oscillator 2, the ultrasonic wave receiver 4 and the control unit 6 each built in the roof center console 1 makes up the burglar sensor.

The ultrasonic wave oscillator 2 comprises an approximately circular cylindrical-shaped casing 2a, and is configured to vibrate a built-in vibrator 16 (FIG. 4), based on a driving signal from the control unit 6, to generate an ultrasonic wave having a given frequency. Specifically, in this embodiment, the ultrasonic wave oscillator 2 is configured to generate an ultrasonic wave having a frequency of about 40 kHz and a wavelength of about 8.5 mm.

The ultrasonic wave receiver 4 comprises an approximately circular cylindrical-shaped casing 4a, and is configured to receive an ultrasonic wave generated by the ultrasonic wave oscillator 2 and reflected in the vehicle interior C of the vehicle V. The ultrasonic wave receiver 4 is configured to generate an electric signal in response to receiving of the reflected wave, and send the electric signal to the control unit 6. In this embodiment, each of the ultrasonic wave receiver 4 and the ultrasonic wave oscillator 2 has substantially the same configuration.

The control unit 6 is connected to the ultrasonic wave oscillator 2 and the ultrasonic wave receiver 4, and configured to control them. Specifically, the control unit 6 is operable, during operation of the burglar sensor, to send the driving signal to the ultrasonic wave oscillator 2 at given time intervals to cause the ultrasonic wave oscillator 2 to generate an ultrasonic wave. Then, the ultrasonic wave receiver 4 is operable, in response to receiving of a reflected wave of the ultrasonic wave generated by the ultrasonic wave oscillator 2, to generate an electric signal, and send the electric signal to the control unit 6. Then, the control unit 6 is operable, based on the electric signal input from the ultrasonic wave receiver 4, to analyze whether or not a Doppler effect arises in the reflected wave, thereby determining the presence or absence of an authorized intruder.

Specifically, a Doppler effect arises in an ultrasonic wave reflected from a moving object within the vehicle interior C. Thus, when a Doppler effect is detected in a state in which there is no authorized passenger within the vehicle interior C, it can be determined that there is an unauthorized intruder within the vehicle interior C. Upon detection of an unauthorized intruder, the control unit 6 is operable to activate a sound generator (not shown) to generate warning sound at a large volume to issue a notice of abnormality.

Specifically, the control unit 6 may be composed of a microprocessor, a memory, an interface circuit, a program for operating them, a speaker serving as a sound generator for generating warning sound, etc., (these components are not shown).

The mounting member 8 is a plate-shaped member which is arranged on a vehicle exterior side of the console cover 10 and configured to allow the ultrasonic wave oscillator 2, the ultrasonic wave receiver 4 and the control unit 6 to be fixed at respective appropriate positions therein. Specifically, the mounting member 8 has a holding portion (not shown) provided in a central region of a reverse (vehicle exterior-side) surface thereof (a surface thereof on a side opposite to the console cover 10), and two holding holes 8a, 8b each for holding a respective one of the ultrasonic wave oscillator 2 and the ultrasonic wave receiver 4. The holding holes 8a, 8b allow the ultrasonic wave oscillator 2 and the ultrasonic wave receiver 4 to be held at respective appropriate positions on the reverse side (vehicle exterior side) of the console cover 10.

The console cover 10 is a member forming an external appearance of the center console 1. The mounting member 8 is mounted on the side of a reverse (vehicle exterior-side) surface of the console cover 10. An ultrasonic wave generated from the ultrasonic wave oscillator 2 is radiated into the vehicle interior C through a sonic emitting portion 10a of the console cover 10, and a reflected ultrasonic wave is received by the ultrasonic wave receiver 4 through a sonic receiving portion 10b of the console cover 10. The console cover 10 is further provided with a pair of illumination lamps 12, and a plurality of manipulation switches 14 for manipulating the roof center console 1.

Figure 3:
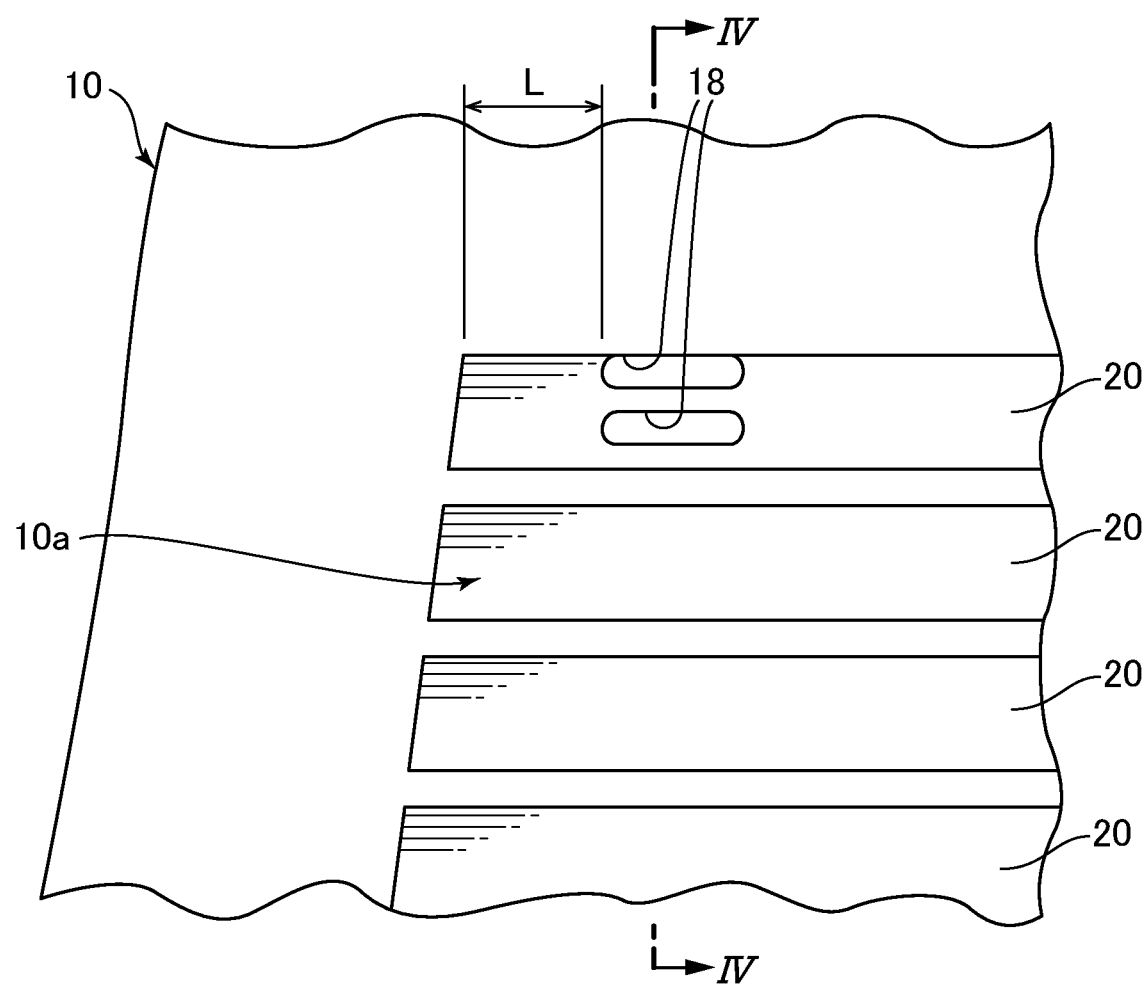
FIG. 3 is a front view enlargedly showing a portion of the roof center console in which an ultrasonic wave oscillator is built, in the burglar sensor arrangement structure according to the first embodiment.
Figure 4:
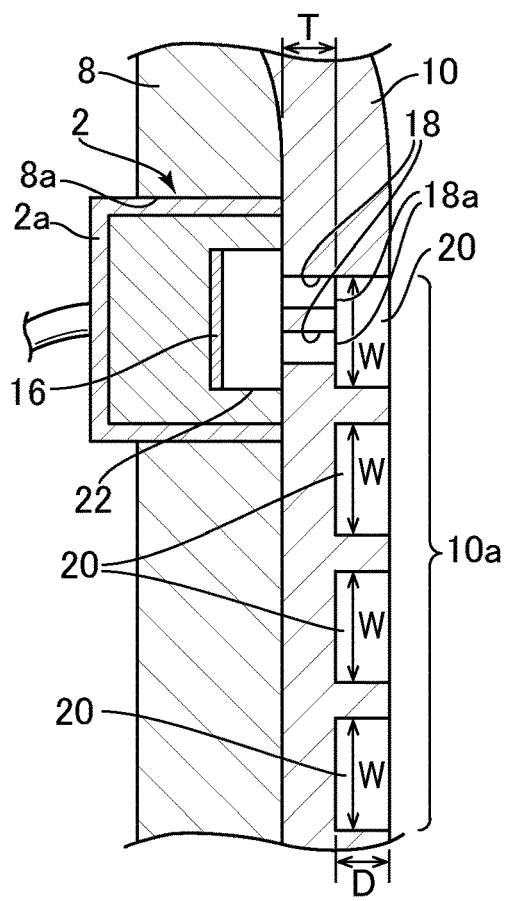
FIG. 4 is an enlarged sectional view of the roof center console in the burglar sensor arrangement structure according to the first embodiment, taken along the line IV-IV in FIG. 3.
Figure 5:
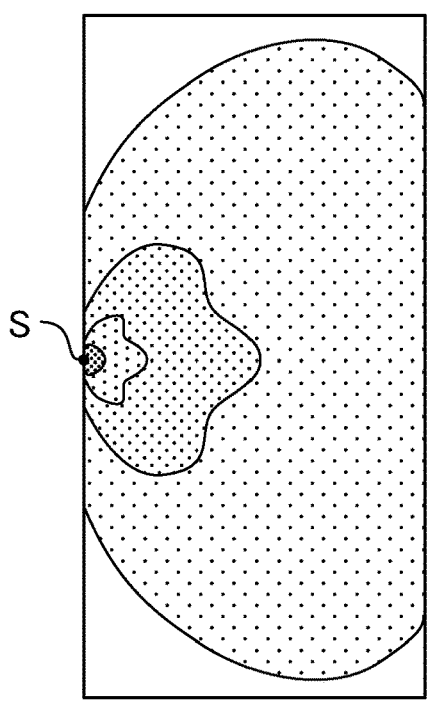
FIG. 5 is a diagram showing a sound pressure distribution of an ultrasonic wave generated from the ultrasonic wave oscillator, in the burglar sensor arrangement structure according to the first embodiment.

Next, with reference to FIGS. 3 to 5, the burglar sensor arrangement structure according to the first embodiment will be described. FIG. 3 is a front view enlargedly showing a portion of the roof center console 1 in which the ultrasonic wave oscillator 2 is built. FIG. 4 is an enlarged sectional view taken along the line IV-IV in FIG. 3. FIG. 5 is a diagram showing a sound pressure distribution of an ultrasonic wave generated from the ultrasonic wave oscillator 2, in the vehicle employing the burglar sensor arrangement structure according to the first embodiment.

As shown in FIGS. 3 and 4, the sonic emitting portion 10a is provided on an obverse (vehicle interior-side) surface of the console cover 10 of the center console 1, and a large number of elongate grooves 20 extending parallel to each other are formed on an obverse surface of the sonic emitting portion 10a. The ultrasonic wave oscillator 2 of the burglar sensor is arranged on the reverse surface of the console cover 10 in a region corresponding to the sonic emitting portion 10a formed with the grooves. In this embodiment, the structure of the sonic receiving portion 10b provided on the obverse surface of the console cover 10 is the same as that of the sonic emitting portion 10a. Further, the aftermentioned arrangement structure of the ultrasonic wave oscillator 2 with respect to the console cover 10 is the same as that of the ultrasonic wave receiver 4 with respect to the console cover 10.

As shown in FIG. 4, the casing 2a of the ultrasonic wave oscillator 2 is fitted in the holding hole 8a provided in the mounting member 8 and held at an appropriate position of the reverse surface of the console cover 10. Further, an ultrasonic vibrator 16 (vibration plate) is arranged within the casing 2a of the ultrasonic wave oscillator 2, and configured to be oscillated at a high frequency in response to the driving signal applied thereto.

Further, an obverse-side opening of the casing 2a of the ultrasonic wave oscillator 2 is covered by the reverse surface of the console cover 10, and a chamber 22 is formed between the ultrasonic vibrator 16 and the reverse surface of the console cover 10.

A portion of the console cover 10 covering the ultrasonic wave oscillator 2 is provided with two elongate holes extending parallel to each other. Each of the two elongate holes functions as a throat portion 18 associated with the ultrasonic wave oscillator 2. In this embodiment, each of the elongate holes forming the throat portions 18 is formed in an oval cross-sectional shape having a width of about 1 mm and a length of about 3.5 mm which are less than the diameter of the ultrasonic vibrator 16. Further, an outside opening 18a at a distal end of each of the throat portions 18 is located within one of the grooves 20 formed on the obverse surface of the console cover 10. That is, respective outside openings of the two throat portions 18 are opened at a bottom surface of one of the grooves 20. Further, the length T of the throat portion 18 is determined by a wall thickness of the portion of the console cover 10 formed with the elongate holes. In this embodiment, the length T is about 1 mm.

In this embodiment, each of the grooves 20 is formed with a rectangular cross-section having a depth D of about 1 mm and a width W of about 3 mm, wherein the large number of grooves 20 each having such a cross-sectional shape are formed to extend parallel to each other at even intervals of about 1 mm. Further, in this embodiment, as shown in FIG. 3, the outside openings 18a of the two throat portions 18 are opened to an endmost one of the grooves 20 in the sonic emitting portion 10a, such that they are arranged side-by-side in a width direction of the endmost groove 20 to extend parallel to a length direction of the endmost groove 20. Further, each of the outside openings 18a is formed in a region of the endmost groove 20 away from one end of the endmost groove 20 by a distance L of about 10 mm (FIG. 3). Preferably, each of the outside openings 18a of the throat portions 18 is formed in a region of a specific one of the grooves 20 away from opposite ends of the specific groove 20 by a distance L which is greater than a wavelength of an ultrasonic wave to be radiated (in this embodiment, about 8.5 mm). Further, each of the grooves 20 is preferably formed to have a width W which is equal to or less than a wavelength of an ultrasonic wave to be radiated, a length which is equal to or greater than two times the wavelength of the ultrasonic wave to be radiated, and a depth of about 1 mm or more. In this case, it is possible to sufficiently control directivity of a radiated ultrasonic wave.

When the driving signal is sent from the control unit 6 to the ultrasonic wave oscillator 2, the ultrasonic vibrator 16 is oscillated at a high frequency to generate an ultrasonic wave in the chamber 22. The ultrasonic wave generated in the chamber 22 is radiated from the side of the obverse surface of the console cover 10 via the two throat portions 18 formed in the console cover 10. Here, the outside openings 18a of the throat portions 18 are opened at the bottom surface of the endmost groove 20, so that an inner wall surface of the endmost groove 20 acts like an acoustic horn, so that the directivity of the radiated ultrasonic wave is improved.

FIG. 5 shows a sound pressure distribution of an ultrasonic wave generated from the ultrasonic wave oscillator 2, specifically, a sound pressure distribution in a case where an ultrasonic wave is generated from the ultrasonic wave oscillator 2 arranged in the arrangement structure illustrated in FIGS. 3 and 4. FIG. 5 shows that an ultrasonic wave radiated from the outside openings 18a of the two throat portions 18 as a sonic emitting source S to the outside spreads around a space, and a sound pressure is gradually lowered with distance from the sonic emitting source S. Here, the ultrasonic wave from the outside openings 18a is radiated from the bottom surface of the groove 20, instead of being radiated directly, so that directivity is improved such that the ultrasonic wave spreads at a sufficiently wide angle. In the sound pressure distribution illustrated in FIG. 5, three regions each having a sufficiently high sound pressure are formed around the sonic emitting source S to spread, respectively, in three different directions, so that it is possible to sufficiently spread the ultrasonic wave throughout the vehicle interior C. In this embodiment, the arrangement structure of the burglar sensor (ultrasonic wave oscillator 2) is contrived such that the outside openings 18a are provided to the bottom surface of the endmost groove 20, thereby improving a sound pressure distribution or directivity.

Figure 6:
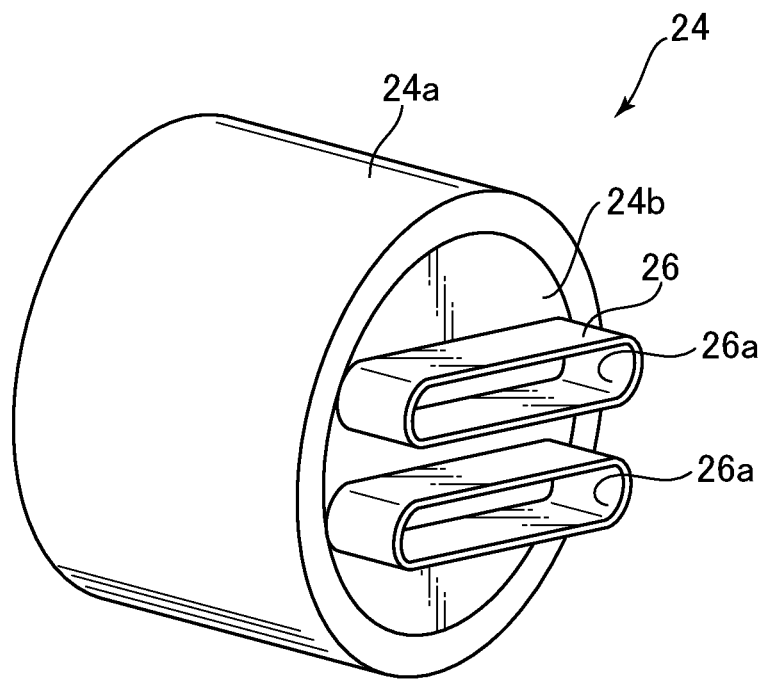
FIG. 6 is a perspective view showing an external appearance of an ultrasonic wave oscillator in a comparative example with respect to embodiments of the present invention.

Next, as a comparative example, a sound pressure distribution in a case where an ultrasonic wave is radiated directly from the throat portions 18 associated with the ultrasonic wave oscillator 2 will be described with reference to FIGS. 6 and 7. FIG. 6 is a perspective view showing an external appearance of an ultrasonic wave oscillator in the comparative example, and FIG. 7 is a diagram showing a sound pressure distribution of an ultrasonic wave generated from the ultrasonic wave oscillator in the comparative example.

As shown in FIG. 6, the ultrasonic wave oscillator 24 of the comparative example comprises an approximately circular cylindrical-shaped casing 24a, and an ultrasonic vibrator (not shown) built in the casing 24a and configured to be oscillated at a high frequency. Further, a cover 24b is provided at one end of the casing 24a to cover the ultrasonic vibrator, and two throat portions 26 each having an oval cross-section are formed to protrude from the cover 24b and arranged side-by-side to extend parallel to each other. That is, in the ultrasonic wave oscillator 2 in the first embodiment, each of the throat portions 18 is formed by an elongate hole provided in the console cover 10, whereas, in the ultrasonic wave oscillator 24 in the comparative example, each of the throat portions 26 is formed inside a protruding tubular wall surface. Each of the throat portions 26 is formed in an oval cross-sectional shape having a width of about 1 mm and a length of about 3.5 mm, as with each of the throat portions 18 associated with the ultrasonic wave oscillator 2 in the first embodiment.

As with the first embodiment, in the ultrasonic wave oscillator 24 in the comparative example, an ultrasonic wave generated by vibration of the ultrasonic vibrator built in the casing 24a is radiated to a chamber in the casing 24a once, and the ultrasonic wave in the chamber is radiated from respective outside openings 26a of the two throat portions 18 to the outside via the throat portions 18. That is, the ultrasonic wave oscillator 24 in the comparative example is acoustically equivalent to the ultrasonic wave oscillator 2 in the first embodiment, except that the outside openings are opened at the bottom surface of one of the grooves.

Figure 7:
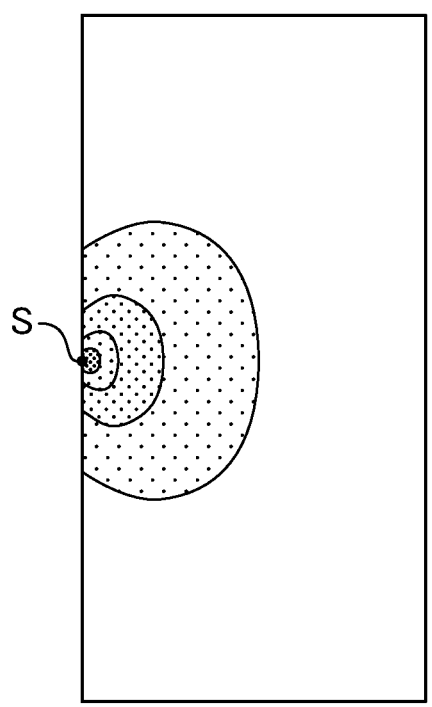
FIG. 7 is a diagram showing a sound pressure distribution of an ultrasonic wave generated from the ultrasonic wave oscillator in the comparative example with respect to embodiments of the present invention.

FIG. 7 shows a sound pressure distribution of an ultrasonic wave radiated from the ultrasonic wave oscillator 24 in the comparative example. In the ultrasonic wave oscillator 24 in the comparative example, an ultrasonic wave passing through the throat portions 26 is directly radiated from the outside openings 26a to a free space. In the ultrasonic wave oscillator 24 in the comparative example, an ultrasonic wave generated by the ultrasonic vibrator is not radiated directly but radiated via the two throat portions 26, so that directivity is controlled to allow the ultrasonic wave to spread at a sufficiently wide angle. However, as compared with the sound pressure distribution in the first embodiment illustrated in FIG. 5, in the sound pressure distribution in the comparative example illustrated in FIG. 7, spreading of the ultrasonic wave is small, and a range capable of obtaining a sufficiently high sound pressure is narrow, so that it is impossible to allow the sound pressure to sufficiently spread throughout the vehicle interior C. Compared with this, in the burglar sensor arrangement structure according to the first embodiment, the outside openings 18a of the throat portions 18 are opened at the bottom surface of the groove 20, so that it is possible to obtain a horn effect and thus radiate the ultrasonic wave at a high sound pressure and over a wide range in the vehicle interior C.

Further, as mentioned above, in this embodiment, the configuration of the sonic receiving portion 10b provided in the console cover 10 is the same as that of the sonic emitting portion 10a, and the arrangement structure of the ultrasonic wave receiver 4 with respect to the console cover 10 is also the same as that of the ultrasonic wave oscillator 2.

Further, it is know that the reciprocity theorem is applicable to an acoustic system. As is evident from the above, by employing, in the ultrasonic wave receiver 4, the same arrangement structure as that of the ultrasonic wave oscillator 2, it becomes possible to receive an ultrasonic wave at a high sensitivity over a wide range in the vehicle interior C.

In this embodiment, each of the throat portions 19 is formed by the elongate hole provided in the console cover 10, separately from the ultrasonic wave oscillator 2. Alternatively, the burglar sensor arrangement structure of the present invention may be constructed using the ultrasonic wave oscillator 24 integrally formed with the throat portions 19 as in the comparative example. In this case, the ultrasonic wave oscillator 24 may be arranged such that the outside openings 26a of the throat portions 26 are located to become flush with the bottom surface of a specific one of the grooves 20 so as to open the outside openings 26a at the bottom surface of the specific groove 20. This configuration also makes it possible to obtain the hone effect based on the groove 20, and thus obtain the same sound pressure distribution as that illustrated in FIG. 5.

As above, in the burglar sensor arrangement structure according to the first embodiment, the outside opening 18a of the throat portion 18 is opened at the bottom surface of the groove 20, so that the ultrasonic wave radiated from the outside opening 18a is emitted into the vehicle interior C while undergoing reflection at an inner wall surface of the groove 20. As a result, the inner wall surface of the groove 20 acts like an acoustic horn, which makes it possible to enhance ultrasonic wave propagation capability, and control directivity of the ultrasonic wave radiated into the vehicle interior C via the groove 20. Thus, in this embodiment, it becomes possible to spread the ultrasonic wave throughout the vehicle interior C. Further, in this embodiment, the outside opening 18a of the throat portion 18 associated with the ultrasonic wave oscillator 2 is opened to the console cover 10, so that the ultrasonic wave oscillator 2 and the console cover 10 are in close contact with each other, and thereby it is possible to install the burglar sensor inside the roof center console 1 in a compact manner.

In burglar sensor arrangement structure according to the first embodiment, the outside openings 18a of the two throat portions 18 are opened at the bottom surface of the same groove 20, so that it is possible to further enhance the ultrasonic wave propagation capability.

In burglar sensor arrangement structure according to the first embodiment, the burglar sensor is arranged with respect to (the console cover of) the roof center console 1, which is the vehicle interior member, so that it is possible to radiate an ultrasonic wave from a vehicle width-directional approximately center of the ceiling surface R of the vehicle interior C to allow the ultrasonic wave to be easily spread throughout the vehicle interior C.

Figure 8:
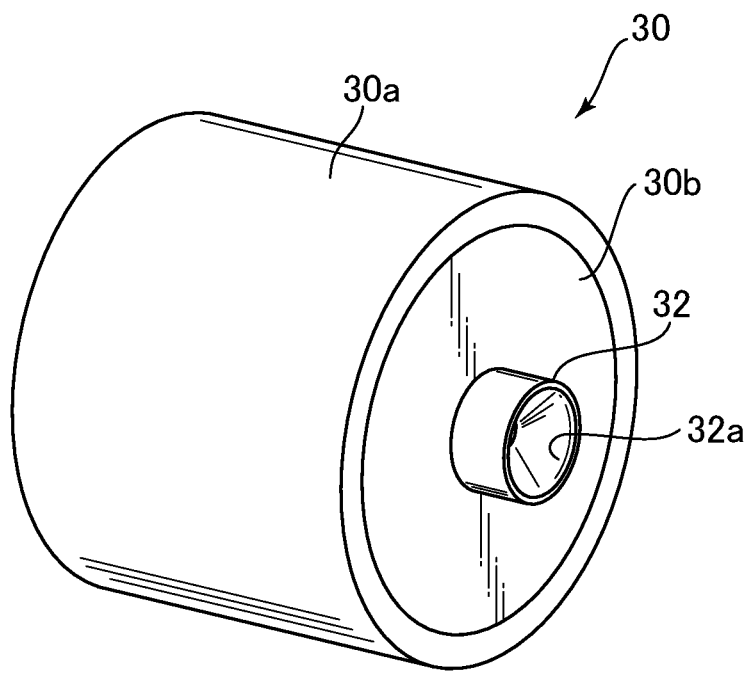
FIG. 8 is a perspective view of an ultrasonic wave oscillator employed in a burglar sensor arrangement structure according to a second embodiment of the present invention.
Figure 9:
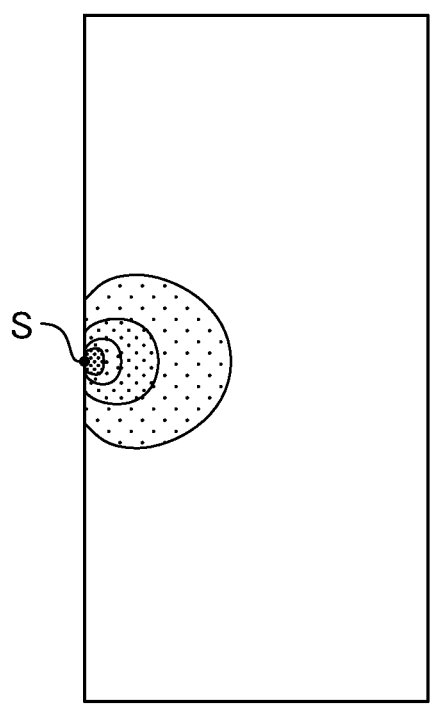
FIG. 9 is a diagram showing a sound pressure distribution obtained in a case where the ultrasonic wave oscillator illustrated in FIG. 8 is operated in a stand-alone manner, in the burglar sensor arrangement structure according to the second embodiment.

Next, with reference to FIGS. 8 and 9, a burglar sensor arrangement structure according to a second embodiment of the present invention will be described. FIG. 8 is a perspective view of an ultrasonic wave oscillator employed in the second embodiment to serve as an ultrasonic wave generation unit. FIG. 9 is a diagram showing a sound pressure distribution obtained in a case where the ultrasonic wave oscillator illustrated in FIG. 8 is operated in a stand-alone manner.

The burglar sensor arrangement structure according to the second embodiment is different from the first embodiment, in terms of the structure of an ultrasonic wave oscillator to be used. Thus, the following description will be made about only a difference between the first embodiment and the second embodiment, and description of the common configuration and functions/effects therebetween will be omitted.

As shown in FIG. 8, an ultrasonic wave oscillator 30 employed in the second embodiment comprises an approximately circular cylindrical-shaped casing 30a, and an ultrasonic vibrator (not shown) built in the casing 30a and configured to be oscillated at a high frequency. Further, the ultrasonic vibrator in the casing 30a is covered by a cover 30b, and a single tubular throat portion 32 is formed to protrude from the center of the cover 30b. A passage formed inside the throat portion 32 spreads in a conical shape toward an outside opening 32a of the throat portion 32.

As with the first embodiment, in the ultrasonic wave oscillator 30 in the second embodiment, an ultrasonic wave generated by vibration of an ultrasonic vibrator built in the casing 30a is radiated to a chamber in the casing 30a once, and the ultrasonic wave in the chamber is radiated from the outside opening 32a to the outside via the throat portion 32.

FIG. 9 shows a sound pressure distribution of an ultrasonic wave obtained in a case where the ultrasonic wave oscillator 30 is operated in a stand-alone manner. In this case, the ultrasonic wave generated by the ultrasonic vibrator (vibration plate) passes through the throat portion 32 having a cross-section less than that of the vibration plate, and therefore receives resistance. As a result, a sound pressure distribution has a rounded shape. In the ultrasonic wave oscillator 30, an ultrasonic wave generated by the ultrasonic vibrator is not radiated directly but radiated via the throat portion 32, so that directivity is controlled to allow the ultrasonic wave to spread at a sufficiently wide angle. However, in the sound pressure distribution illustrated in FIG. 9, spreading of the ultrasonic wave is insufficient, and a range capable of obtaining a sufficiently high sound pressure is narrow.

Although the ultrasonic wave oscillator 30 in the second embodiment is incapable of obtaining a sufficiently wide directivity when it is operated in a stand-alone manner, the ultrasonic wave oscillator 30 can have a sufficiently wide directivity by arranging it in the same manner as that in the arrangement structure according to the first embodiment. Specifically, by arranging the outside opening 32a of the throat portion 32 such that it is opened at a bottom surface of a groove formed on a vehicle interior member, in the same manner as that in the first embodiment, it becomes possible to obtain a wide directivity equivalent to the pressure distribution illustrated in FIG. 5. As above, an ultrasonic wave oscillator having a throat portion with any of various cross-sectional shapes can be applied to the burglar sensor arrangement structure of the present invention.

In the ultrasonic wave oscillator 30 according to the second embodiment, the throat portion 32 is integrally provided to the ultrasonic wave oscillator 30. Alternatively, the throat portion 32 may be formed by a conical hole provided in a vehicle interior member (console cover).

Figure 10:
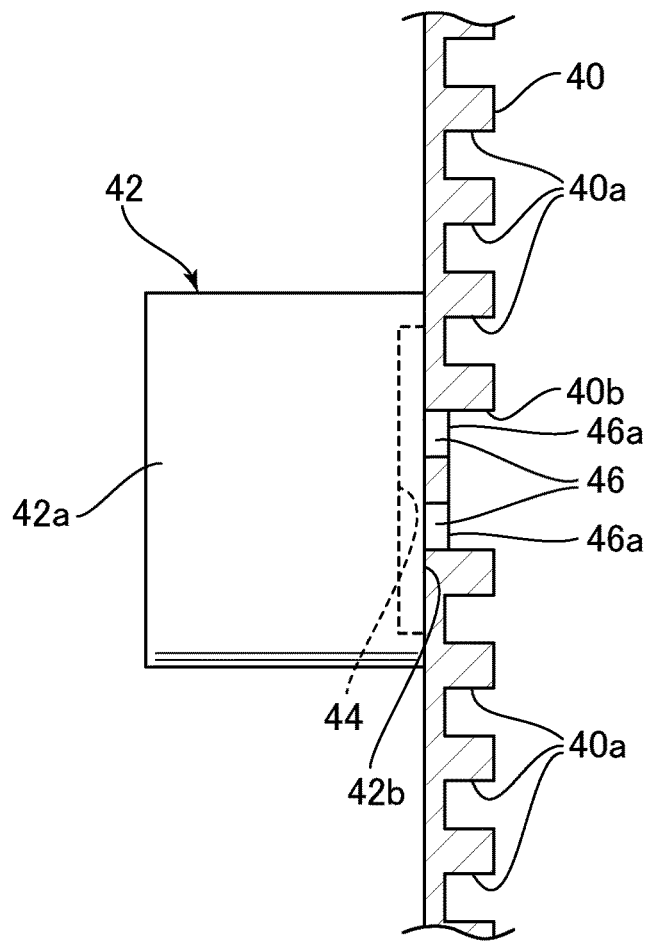
FIG. 10 is a sectional view of a state in which an ultrasonic wave oscillator is mounted to a vehicle interior member, in a burglar sensor arrangement structure according to a third embodiment of the present invention.
Figure 11:
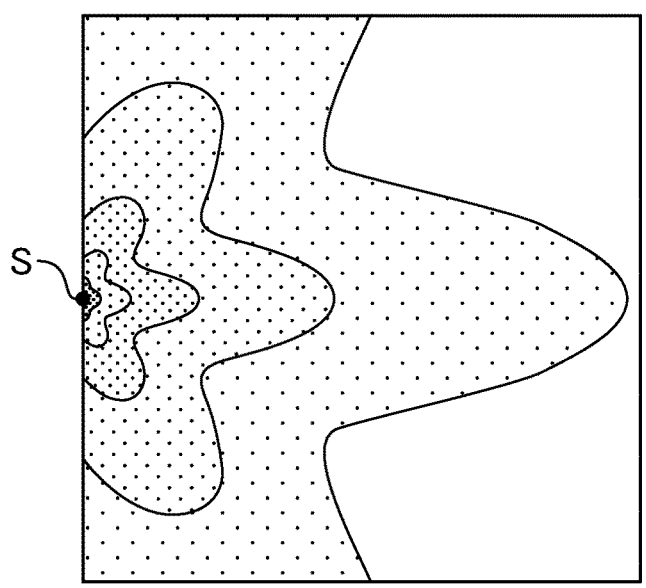
FIG. 11 is a diagram showing a sound pressure distribution of an ultrasonic wave radiated from the burglar sensor arrangement structure according to the third embodiment illustrated in FIG. 10.

Next, with reference to FIGS. 10 and 11, a burglar sensor arrangement structure according to a third embodiment of the present invention will be described. FIG. 10 is a sectional view of a state in which an ultrasonic wave oscillator is mounted to a vehicle interior member, in the burglar sensor arrangement structure according to the third embodiment. FIG. 11 is a diagram showing a sound pressure distribution of an ultrasonic wave radiated from the arrangement structure illustrated in FIG. 10.

The burglar sensor arrangement structure according to the third embodiment is different from the first embodiment, in terms of the structure of an ultrasonic wave oscillator to be used, and the structure of a vehicle interior member to which the ultrasonic wave oscillator is mounted. Thus, the following description will be made about only a difference between the first embodiment and the third embodiment, and description of the common configuration and functions/effects therebetween will be omitted.

As shown in FIG. 10, in the arrangement structure according to the third embodiment, an ultrasonic wave oscillator 42 which is an ultrasonic wave generation unit is mounted to a reverse surface of a vehicle interior member 40.

An obverse surface of the vehicle interior member 40 is formed with a large number of linear grooves 40a extending parallel to each other at even intervals. Each of the grooves 40a is formed with an approximately square cross-section having a width of about 1 mm and a depth of about 1 mm. Further, the grooves 40a are formed at intervals of about 1 mm. A groove 40b provided on the obverse surface of the vehicle interior member 40 in a region corresponding to the ultrasonic wave oscillator 42 is formed with an approximately rectangular cross-section having a relatively wide width of about 3 mm and a depth of about 1 mm, wherein two or more of the grooves 40a each having a relatively narrow width are formed on each side of the wide groove 40b.

The ultrasonic wave oscillator 42 comprises an approximately circular cylindrical-shaped casing 42a, and an ultrasonic vibrator 44 built in the casing 42a and configured to be oscillated at a high frequency. Further, the ultrasonic vibrator 44 in the casing 42a is covered by a cover 42b, and two cross-sectionally oval and tubular throat portions 46 are formed to protrude from the cover 42b. Respective outside openings 46a of the two throat portions 46 are opened at a bottom surface of the single wide groove 40b and located to become flush with the bottom surface of the groove 40b. Here, the configuration of a passage formed inside each of the throat portions 46 is the same as that of the throat portions associated with the ultrasonic wave oscillator 24 illustrated in FIG. 6.

As with the first embodiment, in the ultrasonic wave oscillator 42 in the third embodiment, an ultrasonic wave generated by vibration of the ultrasonic vibrator 44 built in the casing 42a is radiated to a chamber in the casing 42a once, and the ultrasonic wave in the chamber is radiated from the outside openings 46a to the outside via the throat portions 46.

FIG. 11 shows a sound pressure distribution of an ultrasonic wave radiated in the arrangement structure illustrated in FIG. 10.

As shown in FIG. 11, by employing the arrangement structure illustrated in FIG. 10, directivity of the radiated ultrasonic wave is controlled such that the radiated ultrasonic wave spreads at wider angle as compared with the sound pressure distribution illustrated in FIG. 5, although the configuration of the throat portions is substantially the same as that in the first embodiment.

In the burglar sensor arrangement structure according to the third embodiment, the groove 40a is formed on each side of the groove 40b to which the outside opening 46a of the throat portion 46 is opened, so that the ultrasonic wave radiated from the groove 40b is hit against and reflected by wall surfaces of the grooves 40a formed on both sides of the groove 40b. By causing interference between a reflected wave from the wall surface of each of the grooves 40b and the ultrasonic wave directly radiated from the groove 40b to which the outside opening 46a of the throat portion 46 is opened, it becomes possible to form a desired directivity characteristic, and further improve the ultrasonic wave propagation capability.

In the burglar sensor arrangement structure according to the third embodiment, two or more of the grooves 40a are formed on the vehicle interior member at positions on each side of the groove 40b, so that it is possible to cause interference with reflected waves from the larger number of grooves 40a. This makes it possible to give a wider variety of directivities to the ultraviolet wave to be radiated, and further improve the ultrasonic wave propagation capability.

Figure 12:
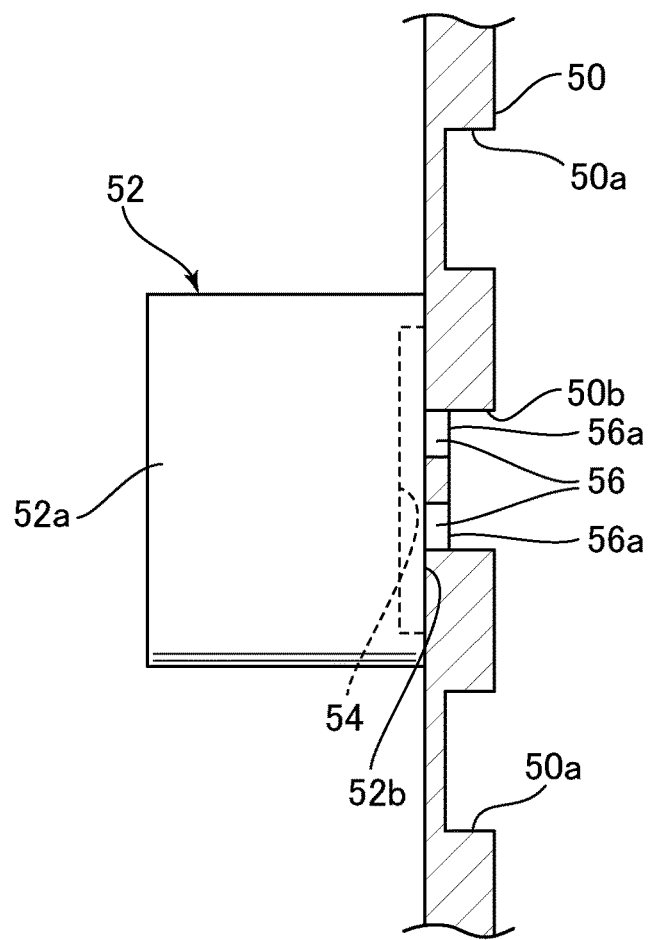
FIG. 12 is a sectional view of a state in which an ultrasonic wave oscillator is mounted to a vehicle interior member, in a burglar sensor arrangement structure according to a fourth embodiment of the present invention.
Figure 13:
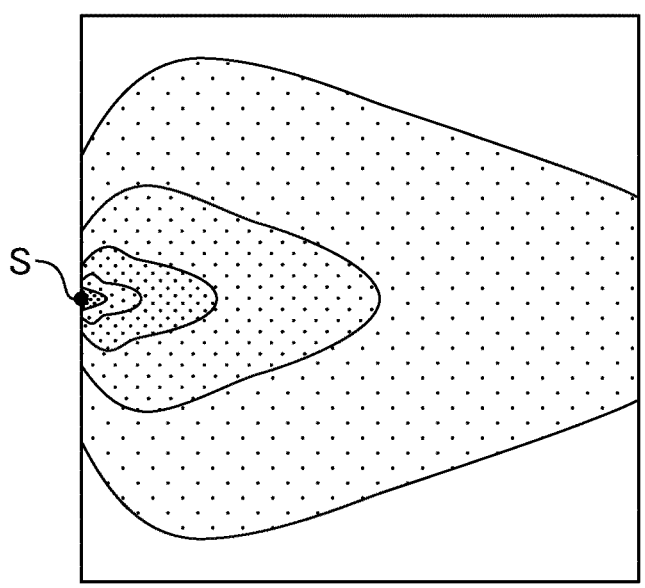
FIG. 13 is a diagram showing a sound pressure distribution of an ultrasonic wave radiated from the burglar sensor arrangement structure according to the fourth embodiment illustrated in FIG. 12.

Next, with reference to FIGS. 12 and 13, a burglar sensor arrangement structure according to a fourth embodiment of the present invention will be described. FIG. 12 is a sectional view of a state in which an ultrasonic wave oscillator is mounted to a vehicle interior member, in the burglar sensor arrangement structure according to the fourth embodiment. FIG. 13 is a diagram showing a sound pressure distribution of an ultrasonic wave radiated from the arrangement structure illustrated in FIG. 12.

The burglar sensor arrangement structure according to the fourth embodiment is different from the first embodiment, in terms of the structure of an ultrasonic wave oscillator to be used, and the structure of a vehicle interior member to which the ultrasonic wave oscillator is mounted. Thus, the following description will be made about only a difference between the first embodiment and the fourth embodiment, and description of the common configuration and functions/effects therebetween will be omitted.

As shown in FIG. 12, in the arrangement structure according to the fourth embodiment, an ultrasonic wave oscillator 52 which is an ultrasonic wave generation unit is mounted to a reverse surface of a vehicle interior member 50.

An obverse surface of the vehicle interior member 50 is formed with a large number of linear grooves 50a extending parallel to each other at even intervals. Each of the grooves 50a is formed with an approximately rectangular cross-section having a width of about 3 mm and a depth of about 1 mm. Further, the grooves 50a are formed at intervals of about 3 mm. A groove 50b provided on the obverse surface of the vehicle interior member 50 in a region corresponding to the ultrasonic wave oscillator 52 is formed with an approximately rectangular cross-section having a width of about 3 mm and a depth of about 1 mm, as with the other grooves 50a, wherein two or more of the grooves 50a are formed on each side of the groove 50b.

The ultrasonic wave oscillator 52 comprises an approximately circular cylindrical-shaped casing 52a, and an ultrasonic vibrator 54 built in the casing 52a and configured to be oscillated at a high frequency. Further, the ultrasonic vibrator 54 in the casing 52a is covered by a cover 52b, and two cross-sectionally oval and tubular throat portions 56 are formed to protrude from the cover 52b. Respective outside openings 56a of the two throat portions 56 are opened at a bottom surface of the single groove 50b and located to become flush with the bottom surface of the groove 50b. Here, the configuration of a passage formed inside each of the throat portions 56 is the same as that of the throat portions associated with the ultrasonic wave oscillator 24 illustrated in FIG. 6.

As with the first embodiment, in the ultrasonic wave oscillator 42 in the fourth embodiment, an ultrasonic wave generated by vibration of the ultrasonic vibrator 54 built in the casing 52a is radiated to a chamber in the casing 52a once, and the ultrasonic wave in the chamber is radiated from the outside openings 56a to the outside via the throat portions 56.

FIG. 13 shows a sound pressure distribution of an ultrasonic wave radiated in the arrangement structure illustrated in FIG. 12.

As shown in FIG. 13, in the case where the arrangement structure illustrated in FIG. 12 is employed, the radiated ultrasonic wave has a significantly narrow directivity, although the configuration of the throat portions is substantially the same as that in the first embodiment. The directivity in the sound distribution in the fourth embodiment is narrower than that in the sound distribution illustrated in FIG. 5, and narrower than that in the sound distribution illustrated in FIG. 7, obtained in the case where an ultrasonic wave is radiated from the ultrasonic wave oscillator 24 in a stand-alone manner. It is believed that this sound pressure distribution is formed as a result of superimposition of reflected waves from the large number of grooves 50a formed on both sides of the groove 50b to which the outside opening 56a of the throat portion 56 is opened.

The burglar sensor arrangement structure providing such a narrow directivity is unsuited for applications necessary to spread an ultrasonic wave radiated from one ultrasonic wave oscillator throughout a vehicle interior C, but suitable as a burglar sensor arrangement structure intended to detect intrusion into a specific region of a vehicle interior C with absolute accuracy. Further, as compared with the case where an ultrasonic wave oscillator is operated in a stand-alone manner, an ultrasonic wave radiated from the ultrasonic wave oscillator 52 in the arrangement structure according to the fourth embodiment is significant stable in terms of sound pressure distribution, and increased in terms of sound pressure.

Although the present invention has been fully described based on the preferred embodiments thereof, it is to be understood that various changes and modifications will be made therein. Particularly, in the above embodiments, on the assumption that the vehicle interior member is the console cover of the roof center console, the burglar sensor is arranged on the vehicle exterior side of the console cover. Alternatively, the arrangement structure of the present invention may be applied to a case where the burglar sensor is arranged with respect to any suitable vehicle interior member other than the console cover, such as an instrument panel. Further, although, in the above embodiments, the bottom surface of the groove to which the outside opening of the throat portion is opened is a flat surface, the bottom surface of this groove may be formed in a curved surface.

LIST OF REFERENCE SIGNS

1: roof center console
2: ultrasonic wave oscillator (ultrasonic wave generation unit)
2a: casing
4: ultrasonic wave receiver (ultrasonic wave receiving unit)
6: control unit
8: mounting member
8a, 8b: holding hole
10: console cover (vehicle interior member)
10a: sonic emitting portion
10b: sonic receiving portion
12: illumination lamp
14: manipulation switch
16: ultrasonic vibrator
18: throat portion
18a: outside opening
20: groove
22: chamber
24: ultrasonic wave oscillator (ultrasonic wave generation unit)
24a: casing
24b: cover
26: throat portion
30: ultrasonic wave oscillator (ultrasonic wave generation unit)
30a: casing
30b: cover
32: throat portion
32a: outside opening
40: vehicle interior member
40a, 40b: groove
42: ultrasonic wave oscillator (ultrasonic wave generation unit)
42a: casing
42b: cover
44: ultrasonic vibrator
46: throat portion
46a: outside opening
50: vehicle interior member
50a: groove
50b: groove
52: ultrasonic wave oscillator (ultrasonic wave generation unit)
52a: casing
52b: cover
54: ultrasonic vibrator
56: throat portion
56a: outside opening

The invention claimed is:

1. A burglar sensor arrangement structure for arranging, with respect to a vehicle interior member, a burglar sensor configured to detect an intrusion into a vehicle interior, comprising:
an ultrasonic wave generation unit for generating an ultrasonic wave; and
a throat portion for radiating the ultrasonic wave generated in the ultrasonic wave generation unit, from an outside opening or a long hole thereof into the vehicle interior,
wherein the vehicle interior member is formed with a groove, and the outside opening of the throat portion is opened at a bottom surface of the groove, and a width of the groove formed of the outside opening is greater than a width of the outside opening.

2. The burglar sensor arrangement structure according to claim 1, wherein two throat portions are provided with the ultrasonic wave generation unit, wherein respective outside openings of the two throat portions are opened at the bottom surface of the same groove.

3. The burglar sensor arrangement structure according to claim 2, wherein the vehicle interior member is formed with at least three grooves, wherein at least one of the grooves is formed on each sides of the groove to which the outside opening of the throat portion is opened.

4. The burglar sensor arrangement structure according to claim 3, wherein the vehicle interior member is formed with at least five grooves, wherein the groove to which the outside opening of the throat portion is opened has a width greater than that of each of the remaining grooves.

5. The burglar sensor arrangement structure according to claim 1, wherein the vehicle interior member is formed with at least three grooves, wherein at least one of the grooves is formed on each sides of the groove to which the outside opening of the throat portion is opened.

6. The burglar sensor arrangement structure according to claim 5, wherein the vehicle interior member is formed with at least five grooves, wherein the groove to which the outside opening of the throat portion is opened has a width greater than that of each of the remaining grooves.

7. The burglar sensor arrangement structure according to claim 1, wherein the vehicle interior member is a console cover of a roof center console mounted to a ceiling surface of the vehicle interior.

* * * * *